No. 809,770. PATENTED JAN. 9, 1906.
M. BÜTTNER.
ASYMMETRIC CELL.
APPLICATION FILED AUG. 4, 1904.
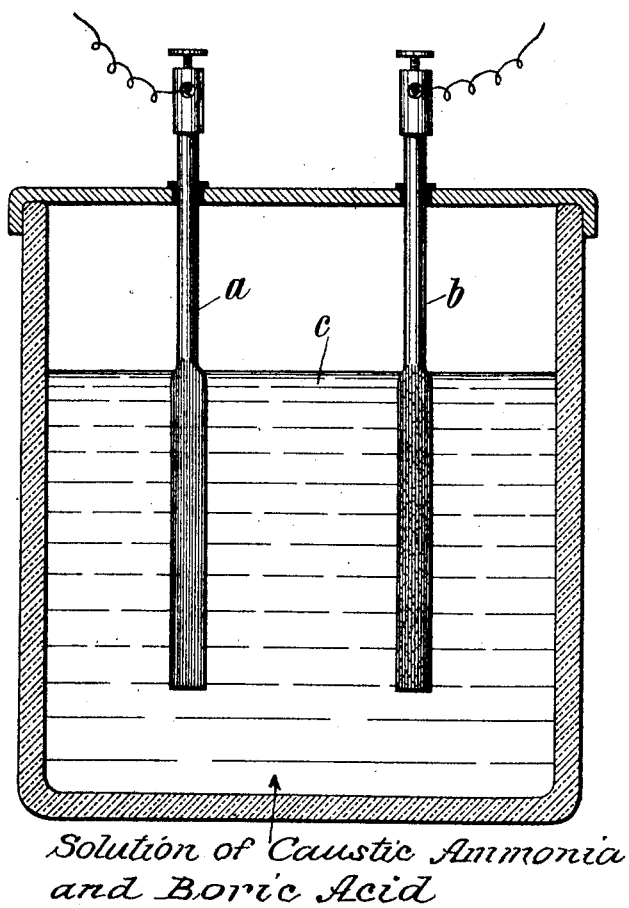
Solution of Caustic Ammonia and Boric Acid
WITNESSES:
W. M. Avery
C. E. Holske
INVENTOR
Max Büttner
BY
ATTORNEYS

UNITED STATES PATENT OFFICE.

MAX BÜTTNER, OF WILMERSDORF-BERLIN, GERMANY.

ASYMMETRIC CELL.

No. 809,770.  Specification of Letters Patent.  Patented Jan. 9, 1906.

Application filed August 4, 1904. Serial No. 219,583.

*To all whom it may concern:*

Be it known that I, MAX BÜTTNER, a subject of the King of Saxony, Germany, and a resident of Wilmersdorf - Berlin, Germany, have invented a new and Improved Asymmetric Cell, of which the following is a full, clear, and exact description.

The invention relates to electrochemistry, and its object is to provide a new and improved electric battery using aluminium electrodes and an electrolyte not liable to corrode the electrode or evaporate quickly, and which electrolyte is capable of raising the resistance of the aluminium when the latter is used as an anode, and is effective at high temperatures.

The invention consists in an electrolyte formed of a solution of caustic ammonia and boric acid and into which extend the electrodes.

In the accompanying drawing, forming a part of this specification, the figure represents a sectional view of a cell embodying my invention.

In the drawing, $a$ and $b$ represent the electrodes, and $c$ represents the electrolyte.

It is well known that an aluminium electrode when used as an anode in certain electrolytes has the property of offering a very high resistance to the passage of the electric current and when employed as a cathode it offers very little resistance.

A battery in which both electrodes are of aluminium forms an electric condenser of great capacity, and a battery having one electrode $a$ of aluminium and the other electrode $b$ of any other metal or carbon, as shown in the drawing, is used as a rectifier for electric alternating currents. For the purposes mentioned it is not necessary that the aluminium be pure, as it may be alloyed with other metals, such as magnesium or zinc.

The electrolytes heretofore used for the two kinds of batteries mentioned are objectionable, as the resistance of the aluminium as an anode is not sufficiently high, or they corrode the aluminium in a comparatively short time, or they are only effective at low temperatures or quickly evaporate or decompose. The above defects are completely overcome by the use of an electrolyte formed of a solution of boric acid and caustic ammonia, and it is not necessary that the solution contain the substances in the proportion of their chemical equivalents, as more or less of either substance can be used.

Having thus described my invention, I claim as new and desire to secure by Letters Patent—

In an asymmetric cell, the combination with an aluminium anode and a cathode of any metal, of an electrolyte consisting of a solution of caustic ammonia and boric acid.

In testimony whereof I have signed my name to this specification in the presence of two subscribing witnesses.

MAX BÜTTNER.

Witnesses:
 WOLDEMAR HAUPT,
 WILLIAM MAYNER.